United States Patent [19]

Barzelay

[11] Patent Number: 4,886,092
[45] Date of Patent: Dec. 12, 1989

[54] LEVELING VALVE

[75] Inventor: Abraham Barzelay, Teaneck, N.J.

[73] Assignee: Ridewell Corporation, Springfield, Mo.

[21] Appl. No.: 261,119

[22] Filed: Oct. 24, 1988

[51] Int. Cl.[4] .............................................. F15B 13/04
[52] U.S. Cl. .................... 137/627.5; 280/714
[58] Field of Search ...................... 137/627.5; 280/714

[56] References Cited

U.S. PATENT DOCUMENTS

| | | | |
|---|---|---|---|
| 2,787,475 | 4/1957 | Jackson | 280/714 |
| 2,820,647 | 1/1958 | Jackson | 280/714 |
| 2,959,426 | 11/1960 | Augustin | 280/714 |
| 2,967,064 | 1/1961 | Valentine | 280/714 |
| 2,967,065 | 1/1961 | Schwendner | 280/714 |
| 2,989,983 | 6/1961 | Valentine | 280/714 X |
| 3,006,657 | 10/1961 | Augustin | 280/714 |
| 3,091,257 | 5/1963 | Ballard et al. | 280/714 X |
| 3,209,784 | 10/1965 | Schwartz | 280/714 X |
| 3,870,233 | 3/1975 | Wilhelm et al. | 251/368 X |
| 4,673,172 | 6/1987 | Blanz | 280/714 X |

FOREIGN PATENT DOCUMENTS 2601665 7/1977 Fed. Rep. of Germany ...... 280/714

*Primary Examiner*—Gerald A. Michalsky
*Attorney, Agent, or Firm*—Rogers, Howell & Haferkamp

[57] ABSTRACT

A leveling valve responsive to changes in vertical distance between a vehicle chassis and its axle. A valve body has an internal chamber with which a supply port communicates for delivering air from a pressurized air tank. One or more delivery ports extend through the valve body in communication with the chamber, each for connection to an air spring. An exhaust port also communicates with the chamber. A piston is reciprocable within the chamber between a normal position in which the valve is closed, a second position in which the valve is open communicating the supply port with one or more delivery ports, and a third position in which the supply port is normally closed by the air source pressure but a passage communicates the one or more delivery ports with the exhaust port. The piston has a passage through it that is used in the third position. Reciprocation of the piston is controlled by a guide having a transverse slot in which a camming pin projects. The camming pin is eccentrically mounted on the end of a shaft that is rotatably supported by the valve body and that rotates in response to changes in the vertical relationship between the vehicle chassis and its axle. Initial adjustment of the piston is done by threading the piston relative to the guide. The stroke of the piston can be adjusted by adjustability of the eccentricity of the eccentric pin.

19 Claims, 2 Drawing Sheets

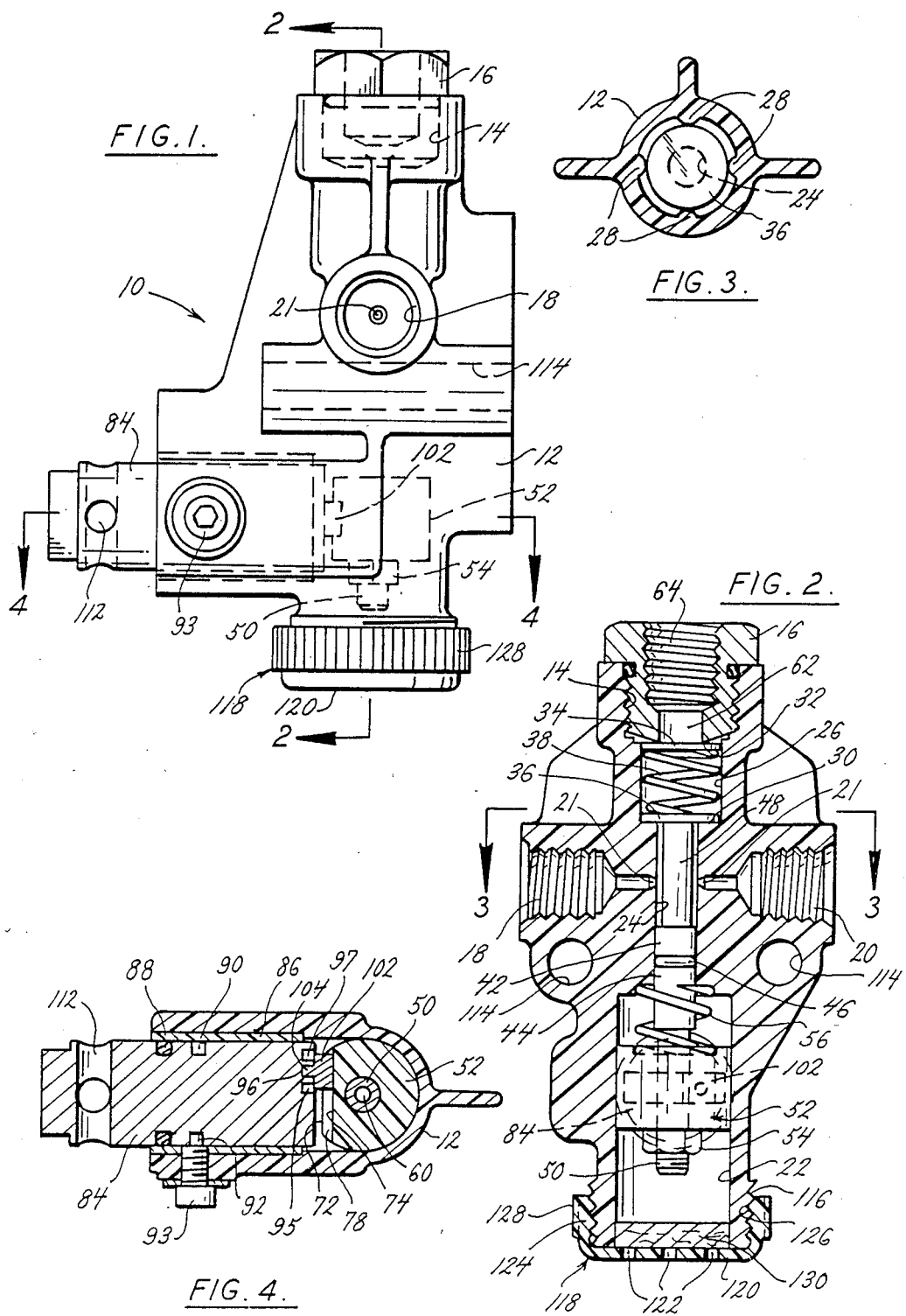

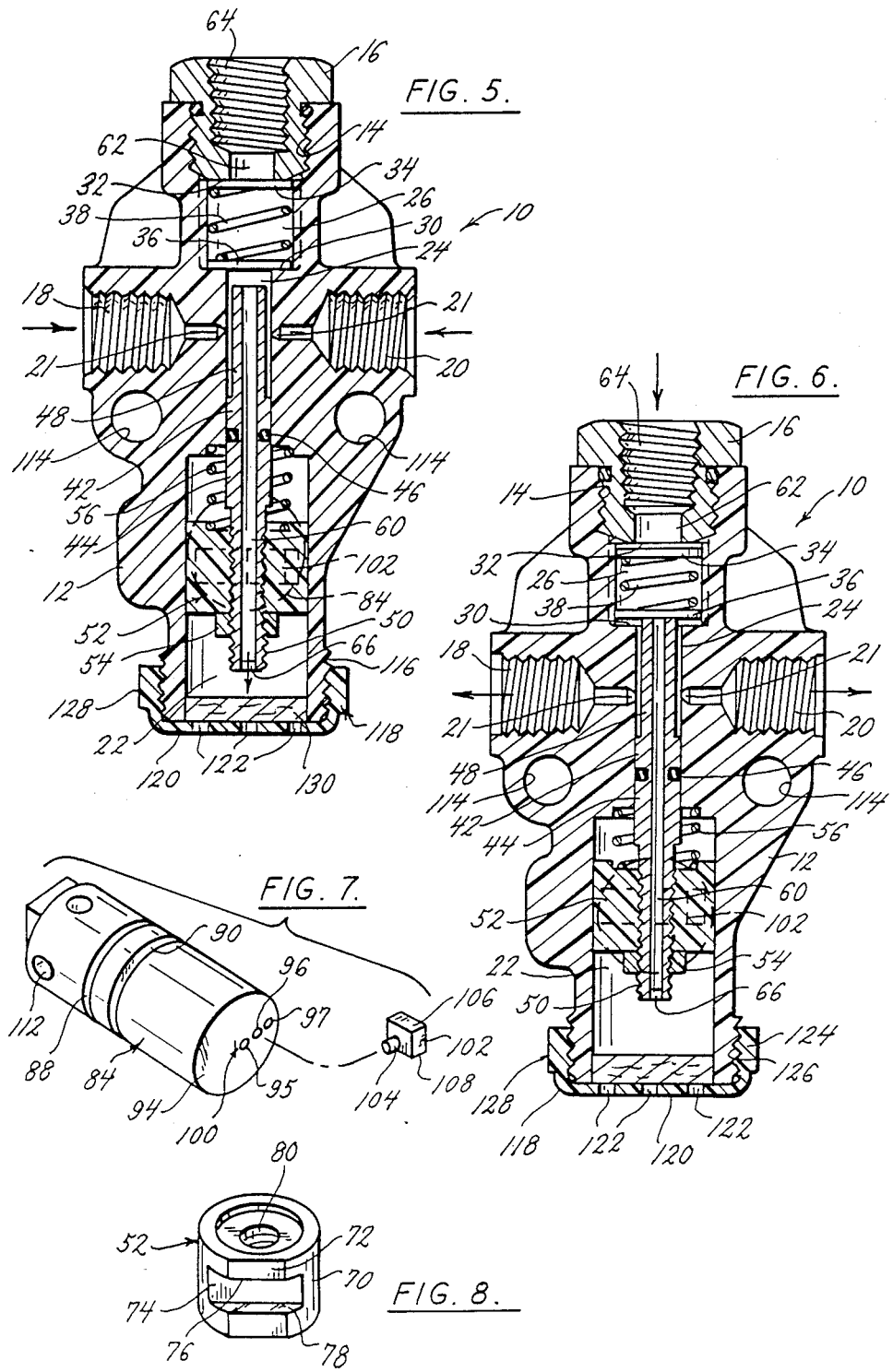

LEVELING VALVE

BACKGROUND OF THE INVENTION

This invention relates to a leveling valve for a vehicle and particularly to a leveling valve for maintaining a constant level of the vehicle chassis relative to its axles in response to unloading and loading conditions.

Leveling valves have been used in the vehicle industry for a number of years. The typical function of a leveling valve is to respond to changes in the vertical relationship between the vehicle chassis and its axles and to compensate therefore by delivering air to or exhausting air from the vehicle's air springs. U.S. Pat. No. 4,379,572 describes and illustrates an air system incorporating one or more leveling valves.

The primary objects of this invention are to provide an air leveling valve that is of simple construction with relatively few parts and components and yet to provide a valve that is positive acting, can be adjusted for speed of response by use of a simple tool, that can be adjusted for duration of open or closed conditions in which air is supplied to or exhausted from the air springs, that can selectively determine the rate of flow or air to and from the air springs, and that has a self-lubricating body.

SUMMARY OF THE INVENTION

The leveling valve of this invention incorporates a Delrin 500 valve body. A supply port opens through the top of the body and is adapted to be connected to an air tank carried by the vehicle, maintained at a predetermined air pressure by a compressor in a manner well known in the art. In the illustrated embodiment, there are two delivery ports through opposite sides of the valve body, each adapted to be connected by suitable tubing to an air spring. Both the supply port and the delivery ports communicate with a piston chamber. Communication by the delivery ports is by way of orifices that can be selectively sized to provide for optimum rates of air flow to and from the delivery ports. At the bottom of the body, there is an exhaust port that also communicates with the piston chamber.

A piston is reciprocable within the piston chamber. Between the piston chamber and the supply port, there is a check valve chamber. One check valve prevents air from flowing back to the air source. The other check valve is normally closed by the excess pressure from the air source but can be opened upon movement of the piston upwardly in the chamber to a position that forces the check valve from its valve seat. In this open condition of the valve, air can flow from the air source to the delivery ports and from there to the air springs.

In the normal condition of the valve, the piston remains in contact with the check valve but allows it to close against its seat. An exhaust condition of the valve has the piston moved away from the check valve. There is an air passage through the piston that is opened to the piston chamber in this latter condition so that air can flow from the air springs through the orifices, the piston chamber, and the piston to the exhaust port.

A guide is threaded onto a lower section of the piston. The guide has a transverse slot in it and an eccentric block mounted on a shaft slides in the slot. When the shaft is rotated in response to changes in the vertical span between the vehicle chassis and its axle, the eccentric block moves the guide upwardly or downwardly to reciprocate the piston.

A perforated plastic cap can be threaded onto the exhaust port to hold a filter in place. The cap has a gradually diminishing internal diameter so that as it is threaded in place, it becomes tightly installed requiring a tool for its removal.

The guide can be adjusted on the piston by rotation of the piston relative to the guide. The lower end of the piston is provided with an Allen wrench socket so that the rotation of the piston can be readily accomplished by the use of an Allen wrench. A lock nut threads on to the end of the piston to lock the piston and guide in the selected relationship.

BRIEF DESCRIPTION OF THE DRAWINGS

FIG. 1 is a side elevation view of the leveling valve.

FIG. 2 is a view in section taken along the plane of the line 2—2 and showing the leveling valve in its neutral position.

FIG. 3 is a view in section taken along the plane of the line 3—3 of FIG. 2.

FIG. 4 is a view in section taken along the plane of the line 4—4 of FIG. 1.

FIG. 5 is a view in section similar to that of FIG. 2 but showing the valve in its exhaust condition.

FIG. 6 is a view in section similar to that of FIGS. 2 and 5 but showing the valve in its air supply condition.

FIG. 7 is a perspective view of the shaft and its eccentric pin.

FIG. 8 is a perspective view of the guide.

DETAILED DESCRIPTION OF THE INVENTION

This leveling valve 10 has a valve body 12 that is preferably made of DuPont Delrin 500. The valve body has an air supply port 14 that is adapted to be connected by way of a special fitting 16 and tubing (not shown) to a pressurized air supply tank that is maintained under pressure by a compressor and is well known in the art. Through its side walls, the body 12 has a pair of delivery ports 18 and 20 that can be connected by tubing (not shown) to separate vehicle air springs also as known in the art. An orifice 21 is associated with each delivery part for regulating the rate of flow of air. Through the bottom of the body 12, the leveling valve 10 has an exhaust port 22.

A piston chamber 24 extends through the valve body from the exhaust port 22 to a check seal chamber 26 and the check seal chamber 26 communicates with the supply port 14. The side wall of the check seal chamber 26 has longitudinal ribs 28 (see FIG. 3) that allows fluid to flow between them as will be described. The annular wall 30 between the piston chamber 24 and the check seal chamber 26 defines a check seal seat 30. There is another annular check seal seat 32 between the check seal chamber 26 and the supply port 14.

An upper check seal 34 is movable within the check seal chamber 26 toward and away from the seat 32. A lower check seal 36 is movable within the chamber 26 toward and away from the seat 30. The check seals 34 and 36 slide along the longitudinal ribs 28 and are aligned by a light compression spring 38.

A piston 42 is slidable within the piston chamber 24. The piston 42 has a body section 44 with an annular groove to receive an O-ring seal 46 that maintains sliding contact with the piston chamber 24. Above the body section 44, the piston 42 has a turned section 48 of smaller diameter than the diameter of the piston chamber 24 thereby providing a space between the wall of the turned section 48 and the wall of the piston chamber 24. Below the piston body section 44, the piston 42 has a threaded section 50 that projects into the area of the exhaust port 22. A plastic piston guide 52 is threaded onto the threaded section 50 and is locked in placed by a lock nut 54. A compression spring 56 is mounted on the piston 42 between the housing, and the guide 52 biases the guide 52 and the piston 42 downwardly as viewed in FIG. 2.

The piston 42 has a bore 60 through it to provide a fluid passage extending the full length of the piston. There is also a passage 62 through the special fitting 16 communicating with a recess 64 in which the end of a tube (not shown) can be installed in a manner known in the art. The lower end 66 of the bore 60 is formed with a hexagonal configuration so that the piston 42 can be rotated by an Allen wrench provided the nut 54 has been loosened or removed.

As particularly shown in FIGS. 4 and 8, the plastic guide 52 has a cylindrical side wall 70 that slides within the exhaust port 22, with one side 72 of the guide being flattened. There is a transverse groove 74 in the flattened side 72 that has parallel upper and lower bearing walls 76 and 78. The guide 52 has an internally threaded bore 80 through it by which it can be threaded on to the threaded section 50 of the piston 42.

A shaft 84 is rotatably mounted in a brass bushing 86 that extends into a side of the housing 12. The shaft 84 is provided with an O-ring seal 88 and an annular groove 90 into which a locating pin 92 projects to hold the shaft 84 in place in the bushing 86. The locating pin 92 is on a stud 93 threaded through the valve body As shown in FIG. 7, the shaft 84 has an inner end 94 that has a plurality of holes, such as three holes 95, 96 and 97 spaced at varying distances from the axial center 100 of the shaft 84. An eccentric block 102 has a pin 104 on it that can be introduced into any one of the holes 95, 96 or 97 depending upon the degree of eccentricity desired. The block 102 has upper and lower parallel bearing faces 106 and 108 that maintain sliding contact with the parallel walls 76 and 78 of the transverse groove 74. When the shaft 84 is properly positioned with the pin 92 in the annular groove 90, the eccentric block 102 will remain in the groove 74 and cannot slide free of which ever hole 95, 96 or 97 contains its pin 104. This arrangement is clearly shown in FIG. 4.

The shaft 84 has at least one hole 112 through it for the mounting of a lever arm that is connected to a vertical link typically connected to a vehicle axle as is known in the art. There are holes 114 through the body by which the valve can be installed to the vehicle chassis. Accordingly, when the vertical span between the chassis and the axle increases, the shaft 84 rotates in one direction and when that span decreases, the shaft 84 rotates in the opposite direction.

There are external threads 116 on the valve body adjacent the end of the exhaust port 22. A plastic cap 118 has an end wall 120 with perforations 122 in it and has an annular side wall 124 with internal threads 126 by which the cap can be threaded onto the threads 116. The internal diameter of the annular side wall 124 of the cap progressively decreases toward the end wall 120. Therefore, as the cap is threaded onto the threads 116, the connection becomes progressively tighter. There are appropriate ribs 128 to facilitate manual tightening of the cap 118 onto the threads 116. Adequate tightening of the cap stretches the plastic to such an extent that the connection becomes very tight and removal of the cap 118 requires a tool. This allows the cap 118 to be manually installed to support a felt air filter 130 and after installation prevents the cap from loosening as a result of vibrations from vehicle operation.

Operation

When this leveling valve 10 is installed, the valve body 12 is supported by the vehicle chassis. Linkage (not shown) extends between the shaft 84 and an axle. When the span between the chassis and the axle decreases, the shaft 84 is rotated in one direction and when that span increases, the shaft 84 is rotated in the opposite direction. With the eccentric block 102 positioned within the slot 74 of the guide 52, rotation of the shaft 84 in the aforesaid one direction moves the piston 42 downwardly while rotation of the shaft 84 in the aforesaid opposite direction moves the piston 42 upwardly. Selection of which hole 95, 96 or 97 is used to receive the pin 104 of the eccentric block 102 will determine the length of the stroke of the piston 42 with incremental rotations of the shaft 84.

FIG. 2 illustrates the valve 10 in its neutral condition. In this neutral condition, the check seal 36 is in sealing contact with the seat 30 because the force produced by air pressure from the air source entering the supply port 64 is greater than the force produced by the air pressure in the air springs supplied by the delivery ports 18 and 20. It should be noted that the check valve 34 at all times will allow air to flow from the air source and the supply port 64 but will prevent reverse flow back through the supply port 64 to the air source. Also in this neutral condition, the shaft 84 is in a position such that the eccentric block 102 positions the upper end of the piston 42 in contact with the check seal 36. Thus, because the check seal 36 is sealed against the seat 30, air cannot flow from the supply port 64 to the delivery ports 18 and 20. Likewise, because the bore 60 through the piston 48 is closed against the check seal 36, air cannot flow from the springs by way of the delivery ports 18 and 20 beyond the area between the piston section 48 and the piston chamber 24. Accordingly, so long as the vertical span between the chassis and the axle does not change, the valve remains in this neutral condition.

The span between the chassis and the axle may increase either because the truck is unloaded or because a wheel falls into a cavity. When this happens, the shaft 84 is rotated in a direction causing its eccentric block 102 to drive the guide 52 downwardly. Downward movement of the guide 52 moves the piston 42 downward, separating its upper end from the check seal 36. This opens communication to the bore 60 through the piston 42 and allows air to flow from the air springs through the delivery ports 18 and 20, the piston chamber 24, the bore 60 and through the exhaust port 22 to atmosphere. As the pressure in the air springs is reduced as a consequence of the foregoing, the support provided by the air springs is reduced, allowing the chassis and axle to move relatively closer together, rotating the shaft 84 and returning the piston 42 back to the neutral condition of FIG. 2. Upon reaching the neutral condition, the upper end of the piston 42 again contacts the check seal 36 and flow from the air springs and the delivery ports 18 and 20 ceases.

If the span between the chassis and an axle decreases, such as from adding load to the vehicle or because a wheel hits a bump that raises the axle, the shaft 84 rotates in its opposite direction. The eccentric block 102 slides in the groove 74 and drives the guide 52 upwardly, raising the piston 42 such as is illustrated in FIG. 6. When the piston 42 rises, its upper end stays in contact with the check seal 36, blocking the passage 66. However, the check seal 36 is lifted away from its seat 30. Under these conditions, air from the air source will push the upper check seal 34 downwardly and will flow through the areas between the grooves 28 and through the area between the check seal 36 and the seat 30 into the piston chamber 24. From there the air can flow through the orifices to the delivery ports 18 and 20 and from there to the air springs. As the air pressure builds up in the air springs, they expand and again increase the distance or span between the chassis and the axle. This causes the shaft 84 to rotate in a direction that draws the piston 42 downwardly. As the piston 42 moves downwardly, the supply source pressure will drive the check seal 36 downwardly. When permitted by the position of the piston 42, the check seal 36 will again seat against the seat 30 and flow of air from the air source will be blocked.

The speed of response of the valve 10 can be adjusted by adjusting the position of the piston 42 relative to the guide 52. The check seal 36 being of rubber or similar material, the piston 42 can be positioned such that a small increment of rotation of the shaft 84 will not change the neutral condition of the valve that is illustrated in FIG. 2. By rotation of the piston 42, using an Allen wrench in the lower hexagonal end 66 while the guide 52 is held stationery by the eccentric block 102, the relative position of the piston 42 is adjustable. This adjustment can be made so fine that an initial upward movement of the piston 42 will immediately push the check seal 36 upwardly from its seat 30 and open the valve. Alternatively, the position of the piston 42 relative to the guide 52 can be adjusted so that a small increment of upward movement of the piston 42 must take place before the check seal 36 unseats from the seat 30. Once the piston 42 has been adjusted to the desired position, it is locked in place by the lock nut 54.

To change the stroke of the piston 42, the pin 92 is withdrawn from the annular groove 90 in the shaft 84 so that the shaft can be removed. The eccentric block 102 is then moved to insert the pin 104 in a different selected one of the holes 95, 96 or 97 and the shaft 84 is reinstalled. Depending upon the degree of eccentricity of the eccentric block 102, the stroke of the piston 42 will be increased or decreased.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed:

1. A leveling valve adapted to respond to changes in vertical distance between a vehicle chassis and at least one axle to adjust the air pressure of an air spring between the axle and the chassis, the valve comprising:
    a valve body;
    a chamber within the valve body;
    a supply port in the valve body communicating with the chamber and adapted to be connected to a source of pressurized air;
    an exhaust port in the valve body;
    at least one delivery port in the valve body communicating with the chamber, and adapted to be connected to at least one air spring bag;
    a piston reciprocally mounted in the chamber;
    a mormally closed check valvel means between the supply port and the chamber and in the path of the piston whereby the check valve means is opened upon movement of the piston to an opening position in which fluid can flow from the supply port to the delivery port;
    fluid passage means through the piston for accommodating fluid flow from the delivery port to the exhaust port, the fluid passage means being closed upon movement of the piston into contact with the check valve means and being opened upon movement of the piston away from contact with the check valve means;
    means responsive to changes in the vertical distance between teh chassis and axle for controlling reciprocation of the piston including a piston guide, means for connecting the piston guide to the piston, means for reciprocating the piston guide and therewith reciprocating the piston, means for adjusting the axial position of the piston guide on the piston and thereby adjusting the position of the piston relative to the check valve,
    a shaft rotatably supported by the valve body with its axis generally normal to the axis of the piston, an eccentric pin, means for mounting the eccentric pin on an end of the shaft including means permitting the selection of the degree of eccentricity of the pin relative to the axis of the shaft, a transverse slot in the piston guide for receiving the eccentric pin, and means responsive to changes in the vertical distance between the chassis and axle for rotating the shaft.

2. The leveling valve of claim 1 wherein:
the means for adjusting the axial position of the piston guide on the piston comprises a threaded connection between the piston and the piston guide whereby rotation of the piston relative to the piston guide changes the axial position of the piston relative to the guide.

3. The leveling valve of claim 1 wherein:
the means for mounting the eccentric pin on the end of the shaft comprises a prong provided on one of the pin and the shaft end and a plurality of complementary recesses provided on the other of the pin and the shaft end, the recesses providing a means of selectively adjusting the eccentricity of the pin from the axis of the shaft by selectively inserting the prong in one of the plurality of recesses.

4. The leveling valve of claim 1 including:
a second check valve means adapted to prevent the flow of fluid from the delivery port to the supply port.

5. The leveling valve of claim 1 including:
a perforated cap adapted to cover the exhaust port, the cap being of plastic and having an internally threaded annular side wall of progressively decreasing diameter, the exhaust port being surrounded by external threads on which the annular side wall is adapted to be hand-threaded to a tightness such that a tool is required to loosen the cap.

6. The leveling valve of claim 1 wherein:
the piston has a section of smaller diameter than the diameter of the chamber, the piston section being located in the chamber between the delivery port and the supply port whereby fluid can flow from the delivery port to the fluid passage means when the piston is moved away from contact with the check valve means.

7. A leveling valve for a vehicle having a chassis and at least one axle comprising:
a valve body;
a chamber within the valve body;
a supply port in the valve body communicating with the chamber and adapted to be connected to a source of pressurized air;
a delivery port in the valve body communicating with the chamber and adapted to be connected to an air spring mounted between the chassis and the axle;
an exhaust port in the valve body communicating with the chamber;
a unitary piston slidably received in the chamber and adapted to move between first, second and third positions relative to the chamber;
a piston guide supported by the valve body and directly connected to the piston, the piston guide being responsive to changes in vertical distance between the vehicle chassis and the axle to move the piston to the first position and communicate the supply port with the delivery port, to move the piston to the second position and stop communication between the supply port and the delivery port, and to move the piston to the third position and communicate the delivery port with the exhaust port; and
the piston being adapted to be rotated relative to the piston guide to adjust the position of the piston relative to the piston guide, and relative to the chamber in the first, second and third positions of the piston.

8. The leveling valve of claim 7 comprising:
an exhaust passage means in the valve communicating with the exhaust port, the exhaust passage means including an axial bore through the piston.

9. The leveling valve of claim 8 comprising:
the piston having a section of smaller diameter than the diameter of the chamber, the piston section being located between the delivery port and the supply port of the valve and enabling fluid flow from the delivery port to the exhaust passage means when the piston is moved to the third position.

10. The leveling valve of claim 7 comprising:
an orifice in the delivery port selectable in size for a desired rate of flow of air therethrough.

11. The leveling valve of claim 7 comprising:
a threaded connection between the piston and the piston guide enabling rotation of the piston relative to the guide to change the axial position of the piston relative to the guide.

12. The leveling valve of claim 7 comprising:
a shaft rotatably supported by the valve body with its axis generally normal to the axis of the piston,
an eccentric pin,
means for mounting the eccentric pin in an end of the shaft,
a transverse slot in the piston guide adapted to receive the eccentric pin;
and means responsive to changes in the vertical distance between the chassis and axle for rotating the shaft.

13. The leveling valve of claim 12 comprising:
the means for mounting the eccentric pin on an end of the shaft including a means enabling the selection of the degree of eccentricity of the pin relative to the axis of the shaft.

14. The leveling valve of claim 7 comprising:
a perforated cap for covering the exhaust port, the cap being of plastic and having an internally threaded annular side wall of progressively decreasing diameter, the exhaust port being surrounded by external threads on which the annular side wall can be hand-threaded to a tightness such that a tool is required to loosen the cap.

15. The leveling valve of claim 7 including:
an Allen wrench opening in an end of the piston enabling use of an Allen wrench to rotate the piston.

16. The leveling valve of claim 7 including:
a slot in the piston guide transverse to the direction of movement of the piston;
a shaft rotatably supported by the valve body; and
an eccentric pin on the shaft projecting into the slot.

17. The leveling valve of claim 16 including:
means for adjusting the degree of eccentricity of the pin relative to the axis of the shaft.

18. The leveling valve of claim 7 including:
the valve body being constructed of Dupont Delrin 500.

19. A leveling valve for a vehicle having a chassis and at least one axle comprising:
a valve body;
a chamber within the valve body;
a supply port in the valve body communicating with the chamber and adapted to be connected to a source of pressurized air;
a delivery port in the valve body communicating with the chamber and adapted to be connected to an air spring mounted between the chassis and the axle;
an exhaust port in the valve body communicating with the chamber;
a piston slidably received in the chamber and adapted to move between first, second and third positions relative to the chamber;
a piston guide supported by the valve body and threaded on the piston;
a shaft rotatably supported by the valve body with its axis generally normal to the axis of the piston;
an eccentric pin;
means for mounting the eccentric pin on an end of the shaft including means for selecting the degree of eccentricity of the pin relative to the axis of the shaft;
a transverse slot in the guide for receiving the eccentric pin; and
means responsive to changes in the vertical distance between the chassis and the axle for rotating the shaft and reciprocating the guide and piston relative to the valve body.

* * * * *